United States Patent [19]

Kersavage

[11] 4,291,679
[45] Sep. 29, 1981

[54] STRUCTURAL SOLAR COLLECTOR

[76] Inventor: Joseph A. Kersavage, 4022 Sequoyah Ave., Knoxville, Tenn. 37919

[21] Appl. No.: 126,880

[22] Filed: Mar. 3, 1980

[51] Int. Cl.³ .............................. F24J 3/02; G02B 5/08
[52] U.S. Cl. .................................... 126/438; 126/427; 350/293
[58] Field of Search ................ 126/438, 426; 350/288, 350/293

[56] References Cited

U.S. PATENT DOCUMENTS

| | | | |
|---|---|---|---|
| 3,991,742 | 11/1976 | Gerber | 126/426 |
| 4,111,360 | 9/1978 | Barr | 126/438 |
| 4,173,397 | 11/1979 | Simpson | 126/438 |
| 4,184,479 | 1/1980 | Ratliff | 126/438 |

Primary Examiner—Samuel Scott
Assistant Examiner—G. Anderson
Attorney, Agent, or Firm—Luedeka & Fitch

[57] ABSTRACT

The upper surface of the building, e.g., roof or portion of the roof, is constructed in the form of a hyperbolic paraboloid having a concave surface directed in a specified, for example, southerly, direction. This concave surface is covered with a reflective material such that solar radiation or the like is reflected to an arcuate focus. An absorber is disposed along the length of the focus for absorbing the reflected radiation. Means are provided for storing and using the absorbed radiation. Thus, a structural portion of a building performs as a concentrating solar collector for the building.

5 Claims, 12 Drawing Figures

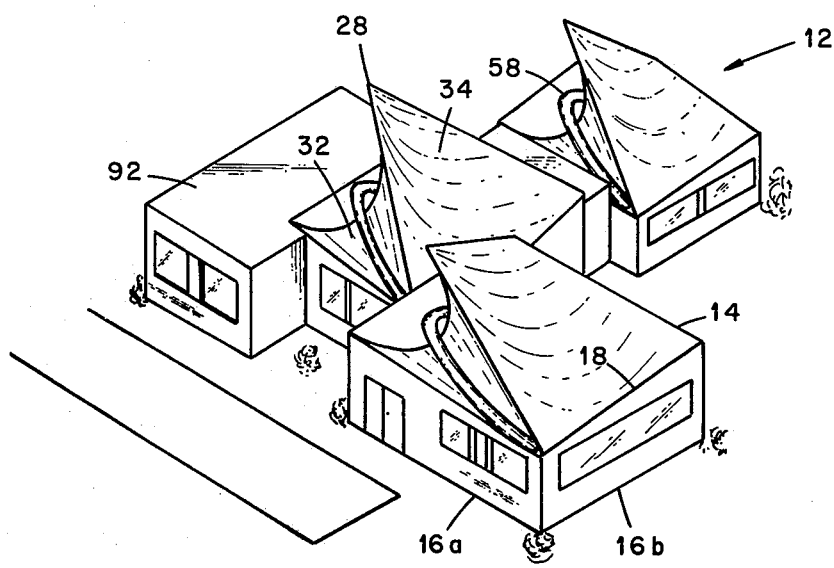
Fig. 1
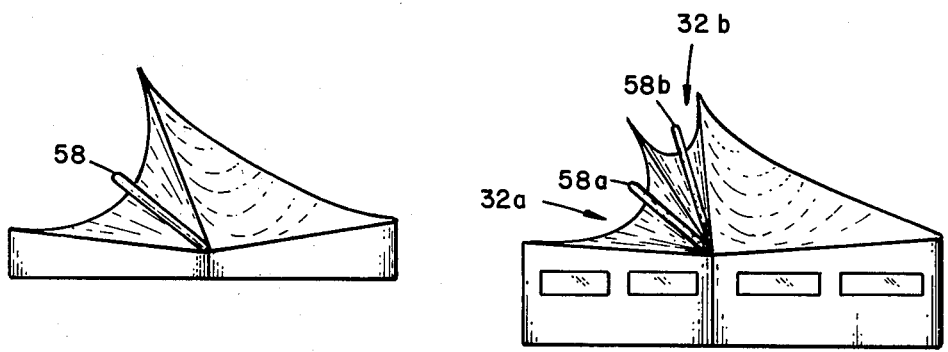
Fig. 2
Fig. 3

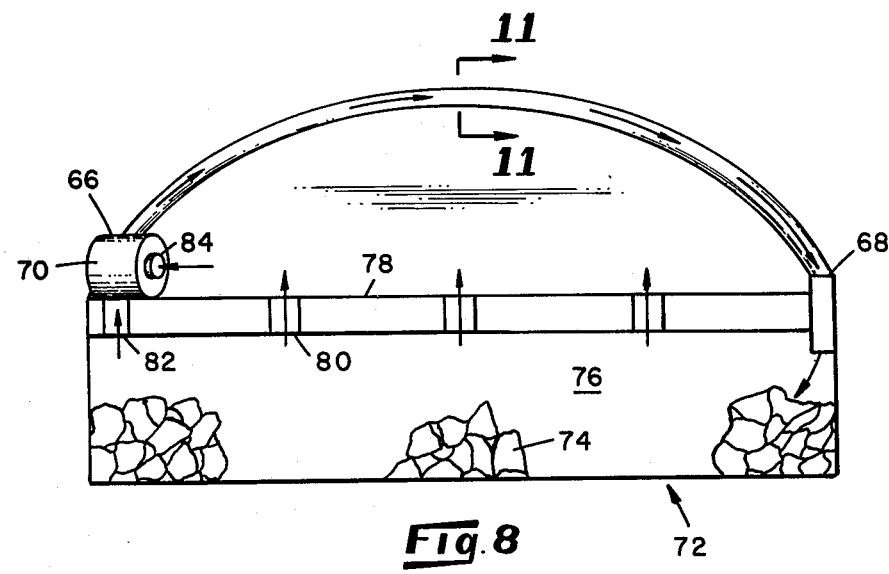
Fig. 8
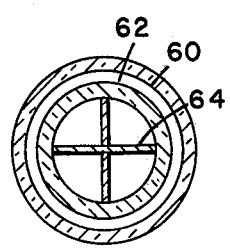
Fig. 9
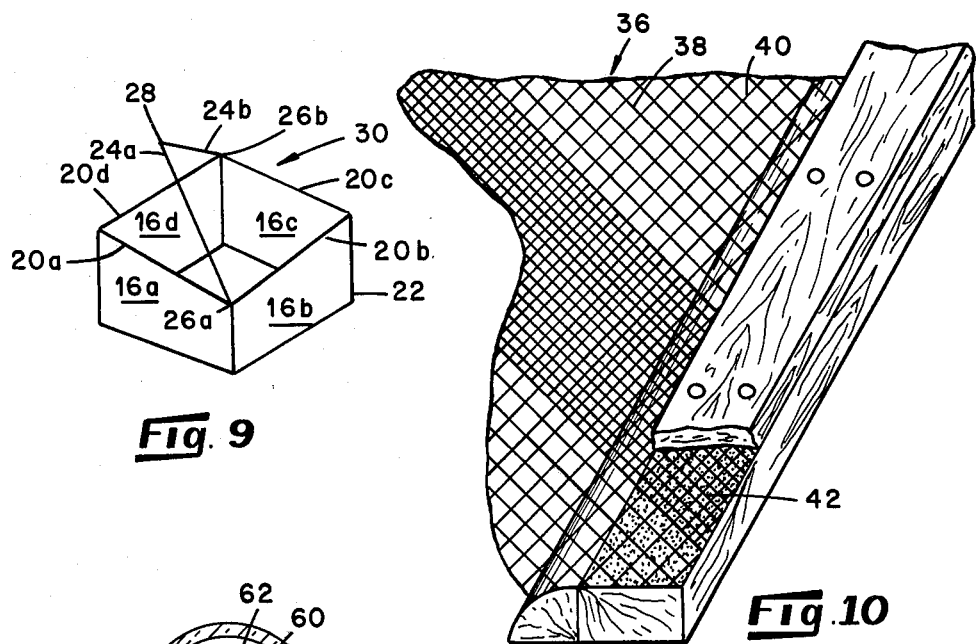
Fig. 10
Fig. 11

STRUCTURAL SOLAR COLLECTOR

This invention relates to solar radiation collectors and methods for their construction. Particularly, this invention relates to a structure adapted for providing a structural portion of a building while simultaneously concentrating and collecting solar radiation.

In view of the diminishing supplies of fossil fuels, solar radiation is being viewed with interest by increasing numbers of people. However, the number of people who have actually purchased or built solar collecting units has been extremely low. Such slow acceptance has been primarily due to the high cost of the units versus a long term payoff. The units have simply been too expensive for individuals to purchase, particularly for retrofitting into existing homes which were not designed for the units. Therefore, much of the development of solar collection units has been aimed at new construction, where the units are designed and constructed along with the building. However, even in the case of new construction, the high costs have deterred widespread introduction of solar collectors.

One reason for the high cost of solar collectors, even in new construction, lies in the duplication of materials. Solar collectors are generally mounted upon the roofs of buildings. On a roof, a unit is least likely to be shaded by surrounding buildings and trees. However, therein lies an inherent duplication of materials. The portions of the roof which are covered with solar collection units are unnecessary or at least unnecessarily protective. That is, if a portion of the building is protected from the elements by a solar collector, the roof section thereunder is not required, except to support the collector. At the same time the portions of the roof which support the solar collection units, e.g. the joists and rafters, must be strengthened to support the added weight of the units. Thus, the units duplicate the shielding aspects of the roof and require additional support, both of which characteristics add to the cost of solar collection units.

An additional concern in the development of solar collection units is the maximum temperature which the units are capable of achieving. The maximum temperature places a limit upon the types of uses available for the unit. Flat plate collectors generally have a maximum temperature of about 180° F. This maximum temperature is sufficient for residential space heating and domestic hot water in some portions of the United States. However, the maximum temperatures are determined under ideal conditions (clear sky and sun directly overhead), which conditions rarely prevail in most parts of the country. That is, the maximum temperature of 180° F. is rarely achieved with a flat unit.

One reason that flat units are so limited in maximum temperatures is that a flat unit is only a collector of sunlight. Even on the clearest, summer day at noon, the amount of sunlight striking the area of a flat collector is incapable of raising the temperature above about 180° F. In fact, the average working temperature is much lower, the exact temperature depending upon the latitude and weather conditions.

In order to raise the maximum temperature of collectors above 180° F. and to raise the working temperatures of collectors under less than ideal conditions, i.e. actual conditions, concentrating collectors are used. A concentrating collector accepts radiation over a large area and reflects or refracts the light onto a smaller area of absorption of energy, i.e., the sunlight is concentrated raising the effective temperature of the collector.

A wide variety of concentrating collectors have been developed. As noted above, some concentrating collectors refract light onto collecting means, such as by employing lenses. Most concentrating collectors focus sunlight onto collecting means employing curved reflective surfaces, such as parabolic mirrors, for example. Unfortunately, while in small concentrating units it has not been too difficult to prepare the required curved surfaces, it is quite difficult, and correspondingly expensive to maintain the proper curvature over large expanses. Moreover, large parabolic structures are not especially stable. Thus, large parabolic-type concentrating collectors are not satisfactory as a structural portion of buildings.

A hyperbolic paraboloid is a geometric shape of the class having double opposed curvature. If two non-parallel, non-intersecting lines in space such as AB and A'B' (skew lines) depicted in FIG. 12 are each divided into equal parts (an equal member of parts to each line), and the division points are connected as shown in FIG. 12, then a warped surface is generated which is called a hyperbolic paraboloid. This surface can not be produced from a flat plane and as noted has a double-opposed curvature. A hyperbolic paraboloid surface is constructed by first defining two skew line segments. Each of the line segments is subdivided into an equivalent number of intervals. Thereafter a plurality of line segments are drawn between the skew line segments at each successive interval to define the saddle-shaped curved surface.

The hyperbolic paraboloid shape has been considered somewhat of an oddity, having very little utility. However, it has been found that properly constructed surfaces of double opposed curvature exhibit extremely high strength characteristics. For example, as disclosed in U.S. Pat. No. 3,927,496, which is incorporated by reference herein, structures having double-opposed curvature can be exceedingly lightweight, yet strong, i.e. having a high strength to weight ratio. Furthermore, the materials used to build such structures are quite inexpensive, e.g., common insect screen, epoxy resin and a simple wooden framework.

It has been found by the present inventor of the structural features of units constructed in accordance with U.S. Pat. No. 3,927,496, primarily hyperbolic paraboloids can be incorporated into a structural member which is suitable for concentrating very large quantities of solar radiation. In particular, it has been found that the hyperbolic paraboloid structure has a focus which is an elongated, arcuate pattern and that a building roof, for example, can be constructed with a hyperbolic paraboloid design and of radiation reflective materials such that the focus of the roof can receive a heat transfer medium that is heated to extremely high temperatures by the focused radiation. To achieve the desired results, the hyperbolic paraboloid is oriented as shown in FIG. 12 with the corners B and A' lying in an East-West line and preferably with the noon sunlight striking the geometrical center, O, of the exposed surface of the hyperbolic paraboloid straight on. The inventor has determined further that the location of the focus (designated "focal arc" in FIG. 12) of the curved surface 32 is related to the span between the points A and B' as depicted in FIG. 12 and the sag, i.e. the distance from a straight line drawn between points A and B' and the center point O of the curved surface 32, measured perpendicularly from such straight line. This relationship is further expressed:

$$f = 1/16 \; (\text{span})^2/(\text{sag}) \qquad \text{Eq. (1)}$$

where:
f=distance from O to the arcuate focus, measured vertically, as viewed in FIG. 12.

From the foregoing Eq. 1, it will be recognized that in deeper curved surfaces 32 (where sag is larger relative to the span), the focus moves nearer the curved surface 32 and its location can be selected to permit an arcuate collector to be physically anchored to the curved surface 32 and be substantially fully within the focus.

It is therefore an object of the present invention to provide a structural solar collector for a building. It is an additional object to provide a concentrating solar collector. It is a further object to provide a concentrating structural solar collector which reduces the duplication of materials in a building and reduces the need for strengthening support materials in a building.

Other objects and advantages will be apparent from the following description, including the drawings in which:

FIG. 1 is a perspective view of a building embodying various of the features of the present invention;

FIG. 2 is a side elevational view of a building embodying various of the features of the present invention;

FIG. 3 is a side elevational view of another building embodying various of the features of the present invention;

FIG. 8 is a schematic diagram of a fluid control system for the building shown in FIG. 1;

FIG. 9 is a perspective view of a frame for a portion of the building shown in FIG. 1;

FIG. 10 is a perspective view of a portion of a frame after attachment of screen members;

FIG. 11 is a cross-sectional view of an absorber taken along line 11—11 of FIG. 8.

Figure 4:
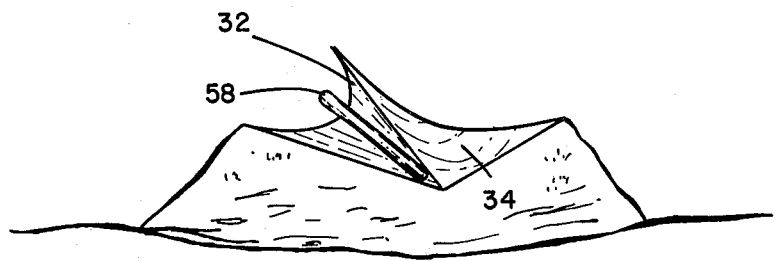
FIG. 4 is a side elevational view of another building embodying various of the features of the present invention.
Figure 5:
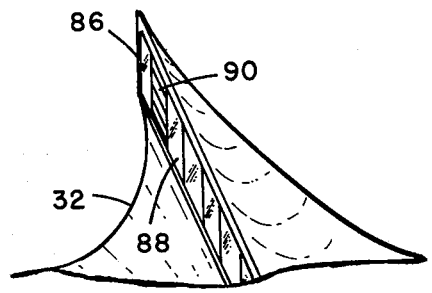
FIG. 5 is a side elevational view of a skylight for a building embodying various of the features of the present invention.

As developed by the present invention, a reflective hyperbolic paraboloid surface oriented with its "parabolic" surface facing incoming radiation focuses such incoming radiation along an arc.

In accordance with the present invention, the upper surface of a building, e.g. roof or portion of the roof, is constructed in the form of a hyperbolic paraboloid having a concave surface directed in a southerly direction. This concave surface is covered with a reflective material such that solar radiation is reflected to an arcuate focus. An absorber is disposed along the length of the focus for absorbing the reflected radiation. Means are provided for storing and using the absorbed radiation. Thus, a structural portion of a building performs as a concentrating solar collector for the building.

Referring to the drawings, one embodiment of a structure embodying various of the features of the invention is shown in FIGS. 1 and 9. The building 12 comprises a plurality of connected rectangular units 14, each of which defines a room of the building. Each unit 14 includes conventional perimetral walls 16a, b, c, and d. The units 14 are arranged adjacent to one another such that each unit shares at least one of its walls 16a, b, c or d with an adjacent unit 14. The walls 16a and 16d of the depicted structure face in a southeasterly direction and a southwesterly direction, respectively. The walls 16b and 16c face in a northeasterly and northwesterly direction, respectively. Each of the walls 16a, b, c and d includes an upper edge 18 defined by elongated lateral support members 20a, b, c and d, respectively. The support members 20a, b, c and d of the walls 16a, b, c and d are supported by vertical support members 22 at each corner of the rectangular unit 14.

Each of the units 14 includes a pair of upper support members 24a and 24b. Each of the members 24a and 24b extends upwardly from the east corner 26a and the west corner 26b, respectively, of the rectangular unit 14, to meet at a common point 28. It is noted that neither of the upper members 24a and 24b is vertical, but rather the two members 24a and 24b for each unit 14 form an isosceles triangle which is directed in a southerly direction. The support members 24a and 24b are rigidly connected to each other at the point 28 and to the members 20a, b, c and d at the corners 26a and 26b. Thus, each unit 14 includes a framework 30 comprising a horizontal rectangular portion defined by the members 20a, b, c and d, and an upwardly directed peak portion defined by the members 24a and 24b. In the depicted embodiment, the support members 20a, b, c and d and 24a and 24b are each four inch by six inch wooden boards, each about sixteen feet long.

In accordance with the present invention, the framework 30 carries two hyperbolic paraboloid surfaces 32 and 34, which provide the roof structure for the unit 14. The space between the frame members 20a, b, c and d and the members 24a and 24b are spanned by a plurality of elongated screen members 36 each of which includes a plurality of substantially parallel and laterally spaced apart strands or filaments 38 extending substantially parallel to the longitudinal dimension of the screen member 36 and a plurality of substantially parallel spaced apart strands or filaments 40 extending substantially parallel to the transverse dimension of the screen member as seen in FIG. 10. The screen employed in the present invention is of an "open weave," meaning that there is substantial open space between adjacent strands. Such screens are typified by the common insect screen available from many building supply or hardware sales outlets. These screens have strands of the order of 0.01 inch in diameter that are woven in a 16×16 pattern (that is, there are 16 strands per lineal inch of width of the screen and 16 strands per lineal inch of screen length). Other strand sizes and other strand densities are acceptable, however, so long as the openness of the screen is sufficient to permit a bonding agent to readily permeate the screen, but not so open as to adversely affect the closing of each opening by the bonding agent, as by the formation of a film across the openings between the filaments 38 and 40, for example. Plastic or glass fiber screens may be used, however metal screens are preferred because of their greater tensile strengths which generally permit the use of a smaller diameter strands for obtaining equivalent strength in the membrane product. In general, metal screens also are easier to handle during construction of the structure.

Referring to the several Figures, the screen members 36 are laid in side by side relation with their longitudinal side edges overlapping the longitudinal side edges of adjacent screen members 36, and in sufficient number to cover the space outlined by the supports 20a, b, c and d and 24a and 24b. Each screen member 36 is pulled taut at its opposite ends 42, hence the ends of the longitudinal strands 38 of the screen are anchored to the perimetral support frame at spaced apart locations. In the depicted embodiment, the ends of the screens that form the surface 32 are anchored to the supports 20a and 24b, which are in a skew relationship to one another. The overlapped edges are bonded to each other to join the adjacent screens to one another and form a continuous screen spanning the space defined by the perimetral support.

The extent of overlap of the longitudinal sides of the adjacent screen members is important in developing the maximum tensile strength in the membrane product. As noted, the ends of the longitudinal strands of each screen member are anchored to the perimetral support frame after having been pulled taut. This positions these strands for maximum realization of their individual and collective tensile strengths. By overlapping the longitudinal side edges of adjacent screens and bonding the overlapped portions together, the transverse strands of the screen members are connected together. The outside longitudinal edge of each screen adjacent the perimetral support frame is anchored to the support so that ultimately there is a continuity of the transverse strands across the space spanned by the screens.

The extent of overlap of the screen edges is chosen such that in combination with the bonding agent employed, the overlapping ends of the transverse strands of the screen members are held together with a force that is substantially equal to or greater than the tensile strength of the transverse strands. This bonding system ensures that in the resultant structure, the full tensile strength of the transverse strands is realized. Development of the strength in the overlapped and bonded areas is accomplished in one embodiment by adjusting the extent of the overlap such that the area is sufficiently large to permit the particular bonding agent employed to establish the bond strength between the ends of overlapping transverse strands which will at least substantially equal the tensile strength of the transverse strands. Thus, stronger bonding agents require less overlap and vice versa.

The openings between the strands 38 and 40 of the screen members are closed preferably after the screens are in place, as by filling the openings with a plastic, concrete or other material that forms a sealing layer 44 across each opening. This filler material bonds the strands 38 and 40 to one another thereby enhancing the stability of the resultant structure against shear forces. Importantly, the filler closes the screen openings, enabling the resultant surface to exclude the natural elements from the interior of the structure.

Figure 6:
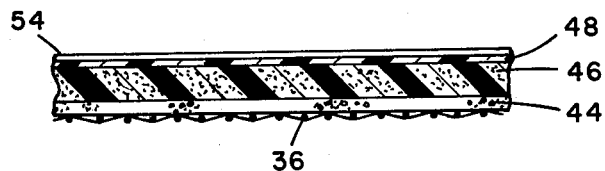
FIG. 6 is a cross-sectional view of a layered structure adapted for the construction of the building shown in FIG. 1.

As shown in FIG. 6, in one embodiment, the screen members 36 are coated first with a layer 44 of concrete having a thickness of less than about one-half inch. Thereafter, a layer 46 of foaming material such as polyurethane foam, for example, is applied over the layer 44.

A membrane seal layer 48, comprising for example, an acrylic plastic or neoprene rubber, is applied over the foam layer 46.

Figure 7:
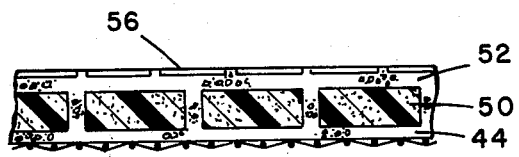
FIG. 7 is a cross-sectional view of a layered structure adapted for the construction of the building shown in FIG. 1.
Figure 12:
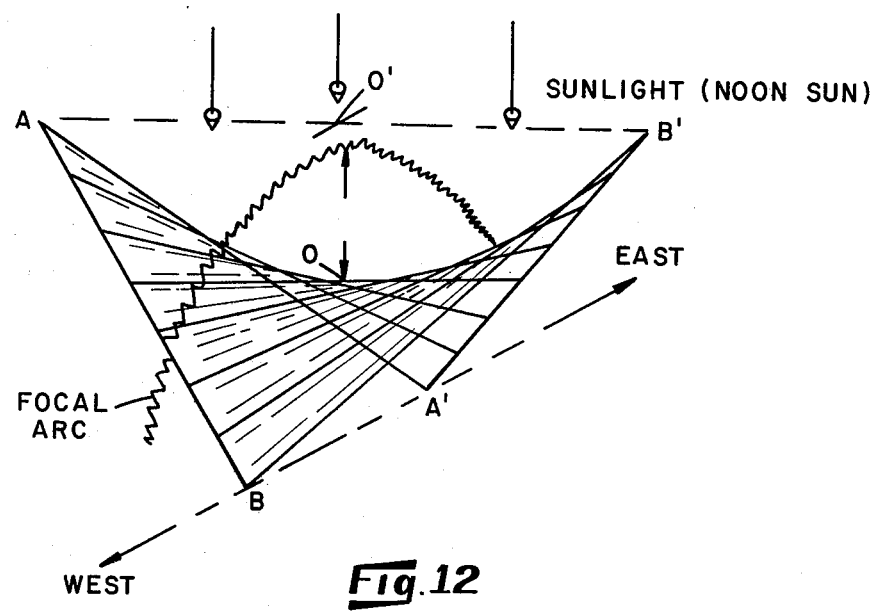
FIG. 12 is a representation of a hyperbolic paraboloid oriented with respect to the path of the sun such that the sun's rays are focused along an arc.

Alternatively, as shown in FIG. 7, individual preformed foam blocks 50, such as polystyrene foam, for example, having a thickness of about four inches are applied to the layer 44 at spaced intervals. Thereafter, an outer layer 52 of concrete, having a thickness of less than about one-half inch is applied over the blocks 50. An excessive amount of concrete is applied in the layer 52 so that the concrete fills the intervals between the spaced apart blocks 50 and bonds to the concrete layer 44 below the blocks 50 to form a composite structure.

Both of the embodiments shown in FIGS. 6 and 7 provide insulation between the interior of the unit 14 and the exposed surfaces 32 and 34 of the structure, while providing surfaces 32 and 34 which have configurations substantially identical to the hyperbolic paraboloids defined by the screens 36.

The exposed surface 32 is covered with a layer of highly reflective material 54, which comprises an aluminum paint or broken mirror pieces 56, for example. In the case of aluminum paint, the surface 32 is made as smooth as reasonably possible, however, a polished surface is not considered to be necessary because of the large area from which radiation is collected and concentrated. In an embodiment which includes broken mirror pieces 56, on the surface 32, small pieces 56 are preferred because they conform more closely to the surface configuration defined by the screens 36. The pieces 56 are adhesively applied to the surface 32 or alternatively are set into the layer 52 before it has set.

In the depicted embodiments, the surface 32 has a arcuate focus, i.e., incoming radiation which strikes the reflective surface 32 is directed to an arcuate focus. The concave surface 32 is directed in a generally southerly direction for a building 12 located in the northern hemisphere. Thus, as the sun travels from west to east, it is always directed generally toward the concave surface 32 for focusing. An elongated, tubular absorber 58, curved in an arcute geometry substantially the same as the arcuate geometry of the focus of the surface 32 is disposed in such focus to collect reflected radiation. In one embodiment, the absorber 32 comprises two concentric glass tubes 60 and 62 which are circumferentially spaced apart. The volume between the tubes 60 and 62 is evacuated to minimize heat transfer by conduction and convection therebetween. A plurality of absorbing fins 64, such as a black-painted metallic material, are disposed within the tube 62.

The tube 62 of the absorber 58 includes an intake end 60 and an outlet end 68/ The intake end 66 is connected to absorbing fluid pump means 70. The outlet end 68 is connected in flow communication with heat sink means 72. The pump means 70 is also connected in flow communication with the heat sink means 72 for recirculation of the absorbing fluid. Means are also provided for withdrawing heat from the heat sink for use within the structure, such as space heating and/or water heating. In some cases the heat is used for air conditioning purposes.

As shown in FIG. 8, in one embodiment the absorbing fluid is ambient air within the unit 14. The pump means 70 comprises a conventional blower and the heat sink 72 comprises a pile of large rocks 74 located in a compartment 76 below the floor 78 of the structure. A plurality of vents 80 are defined in the floor 78 to provide flow communication between the compartment 76 and the interior of the unit 14. The blower 70 includes two intake ports 82 and 84. The port 82 is in flow communication with the compartment 76 and the port 84 is in flow communication with the interior of the unit 14. Suitable conventional damper means are provided in the ports 82 and 84 for selectively adjusting the proportions of air drawn from the compartment 76 and the unit 14 by the blower 70 for introduction into the tube 62.

In operation, solar radiation is reflected by the surface 32 toward the focus thereof where the absorber 58 is located. The reflected radiation strikes the fins 64 in the tube 62, imparting energy thereto in the form of heat. Cool air is drawn from the unit 14 through the port 84 and forced through the tube 62 of the absorber 58 by the blower 70. As the air passes through the tube 62, it collects energy from the fins 64 in the form of heat. The fins 64 also serve to cause tubulence in the air flow, which improves the absorption of energy from the fins 64. After passage through the tube 62, the air is released into the compartment 76 where a portion of the heat energy carried by the air is absorbed by the rocks 74. Thereafter the air flows upwardly through the vents 80 into the unit, warming the interior of the unit 14.

When the air within the unit 14 reaches the desired temperature, the port 84 and/or the vents 80 are closed and the port 82 is opened to develop a closed loop which includes only the absorber 58 and the compartment 76. In this manner, although energy may not be required for space heating at a particular time, it may be stored in the rocks 74 or applied to other uses, such as water heating or in some cases air conditioning.

Various modifications are suitable to adapt the structural collectors of the present invention for particluar latitudes and climate conditions.

As noted hereinabove, the surface 32 is directed in a southerly direction in order to maximize the amount of solar radiation collected throughout the day. Although the amount of sunlight received by the surface 32 is maximized when the sun light arrives parallel to the plane defined by the curved absorber 58, such optimum conditions actually occur only twice a year for fixed collectors. It is therefore important to consider the portions of the year when the unit is expected to deliver the greatest amounts of energy. The surfaces 32 of the building 12 are constructed so that the best possible concentration is achieved during these peak energy usage periods. For example, in the southern regions of the United States, residential housing requires space heating during only the winter months. In such regions, the absorbers of the units of a house are directed to an angle of about 50° for optimum concentration of the winter sun. That is, the latitudinal arc traversed by the sun during the winter months, relative to these regions, is bisected by a plane directed at about 50° from horizontal.

On the other hand, in northern regions of the United States, where residential space heating is required in spring and fall as well as winter, a single collector for each unit is often insufficient. Therefore, as shown in FIG. 2, for example, a pair of collecting surfaces 32 are built into each unit 14 of the building 12. A winter collector 32a includes an absorber 58a which is directed at an angle of about 30° from the horizontal and a spring-fall collector includes an absorber 586 which is directed at an angle of about 70° from the horizontal. A secondary pair of frame members 24a and 24b extend from the corners 26a and 26b to serve as support members for the winter collector surface 32a and as upper members for the spring-fall collector surface 32b.

In another embodiment, shown in FIG. 4, the walls 16a, b, c and 4 of the building 12 are located below ground level in order to minimize the amount of heating and/or cooling required. In northern regions, especially, energy requirements for space heating are reduced substantially by underground construction. The underground temperatures remain quite constant never especially hot or cold. Thus, minimal amounts of energy are required for heating or cooling, depending upon the location.

In addition, a skylight 86 is included in the building structure 12 to maximize the benefits of the winter sun. The skylight 86 comprises a plurality of transparent panels 88, such as double-glazed glass which are vertically mounted between pairs of upper members 24a and 24b. The vertical orientation of the panels 88 provides optimum advantage of the winter sun, particularly in northern regions.

The overall shape of the collectors of the present invention also provide a natural cooling effect for the summer months because of the high ceilings defined by the collector surfaces 32 and 34. Hot air naturally rises, so that by including one or more vents 90 among the panels 88, hot air is selectively vented to the atmosphere.

For most buildings, a collector is not required for every unit in the structure. In such instances supplemental units 92 of conventionalsconstruction are joined to one or more of the units 14. For example, the units 14 of the structure may include a living room, dining room and bedroom while the units 92 include the kitchen, bath and closets.

As a further alternative, the absorbing member may comprise photoelectric conversion means whereby incident solar radiation is converted to electrical energy for immediate use within the unit, or for storage in batteries.

Solar collectors constructed in accordance in the present invention can provide a structural portion of a building, eliminating the wasteful duplication of materials incurred when units are added to a building roof. Also, the collectors do not require substantial strengthening of support material. Moreover, the collectors concentrate radiation from a large area.

Employing a collector constructed in accordance with the present invention, including five foot long support members and a reflective surface area of about 25 square feet, temperatures in excess of 400° F. have been achieved along the focus. A collector which includes frame support members having a length of sixteen feet provides a reflecting member with a surface area of about 200-250 square feet, depending upon the angle formed between the support members. All of the radiation striking this expanded surface is focused onto a single absorber rather than several absorbers, each of which naturally loses some of the collected energy through inherent inefficiencies. As a result, acceptable working temperatures are maintained even during periods of low radiation. Proper consideration of the latitude and climate conditions of the proposed building permits adaptation of the collectors for optimal collection.

It is noted that any hyperbolic parabloid is made of an infinite number of individual hyperbolic parabloids. Further, two or more hyperbolic parabloids may be combined to provide an array of such structures, each of which is optically independent or separate of the other. In either event, the concepts disclosed herein apply.

Concentration and collection of solar radiation has been described specifically herein. It will be recognized, however, that the present invention is useful also in concentrating and collecting other electromagnetic radiation, e.g. microwaves. Particularly, the present invention provides a means for receiving electromagnetic radiation from a relatively expansive region containing a plurality of sources without tracking apparatus.

While a preferred embodiment has been described and shown herein, it will be understood that there is no intention to limit the invention by the disclosure, but rather, it is intended to cover all modifications and alternate constructions falling within the spirit and scope of the invention as defined in the appended claims.

What is claimed is:

1. An apparatus for concentrating and collecting radiant energy from an energy source comprising a reflector member and curved elongated absorbing member, said reflecting member comprising a hyperbolic paraboloid structure having a reflective concave surface directed toward said energy source for reflecting said radiant energy to a curved, elongated focus, said elongated collecting member extending along said focus.

2. An apparatus as defined in claim 1 wherein said reflector member comprises a structural portion of a building.

3. An apparatus as defined in claim 1 wherein said reflector member comprises a substantially rigid frame defining a perimeter of said member, and including two skew support members, a plurality of elongated screen members disposed between said skew support members in side by side relation with their adjacent side edges disposed in overlapping relation with each other and collectively defining an hyperbolic paraboloid surface, each of said screen members including a plurality of longitudinal strands and transverse strands, each of said screen members being tensioned in the direction of said longitudinal strands whereby each of said longitudinal strands extends in a substantially straight line between spaced apart locations on said skew support members, means anchoring the ends of each of said screen members to said skew frame members, means closing the openings between said strands of each said screen members, and reflective means on said concave surface.

4. An apparatus as defined in claim 1 wherein said absorbing member includes a tubular member having a first end and a second end and said absorbing member is connected at a first end to a fluid pump and at a second end to a heat sink, whereby fluid is pumped from said first end of said absorbing member, through said tubular member to said second end for absorption of heat by said heat sink.

5. An apparatus as defined in claim 3 wherein insulating means are included between said closing means and said reflecting means.

* * * * *